US012736978B2

(12) United States Patent
Matsuzaki et al.

(10) Patent No.: US 12,736,978 B2
(45) Date of Patent: Sep. 15, 2026

(54) CONTROL DEVICE, CONTROL METHOD, AND STORAGE MEDIUM

(71) Applicant: HONDA MOTOR CO., LTD., Tokyo (JP)

(72) Inventors: Sango Matsuzaki, Wako (JP); Misa Komuro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/945,778

(22) Filed: Nov. 13, 2024

(65) Prior Publication Data

US 2025/0155896 A1 May 15, 2025

(30) Foreign Application Priority Data

Nov. 14, 2023 (JP) ................................ 2023-193582

(51) Int. Cl.
*G05D 1/633* (2024.01)
*G05D 1/622* (2024.01)
*G05D 107/17* (2024.01)

(52) U.S. Cl.
CPC ............ *G05D 1/633* (2024.01); *G05D 1/637* (2024.01); *G05D 2107/17* (2024.01)

(58) Field of Classification Search
CPC .... G05D 1/633; G05D 1/637; G05D 2107/17; G05D 2107/60; G05D 2109/10; G01C 21/20; G01C 21/00; G06T 5/30; G06T 5/50; G06T 7/80; G06V 20/58
See application file for complete search history.

(56) References Cited

U.S. PATENT DOCUMENTS

2006/0184274 A1 8/2006 Sakai et al.
2009/0043440 A1* 2/2009 Matsukawa .......... G05D 1/0238 701/25
2014/0031981 A1 1/2014 Fernando et al.
2014/0148989 A1 5/2014 Ueda et al.
(Continued)

FOREIGN PATENT DOCUMENTS

CN 111427369 7/2020
CN 113985897 1/2022
(Continued)

OTHER PUBLICATIONS

Japanese Notice Of Allowance for Japanese Patent Application No. 2023-193582 mailed Jul. 1, 2025.
(Continued)

*Primary Examiner* — Donald J Wallace
*Assistant Examiner* — Jalal C Coduroglu
(74) *Attorney, Agent, or Firm* — Amin, Turocy & Watson, LLP

(57) ABSTRACT

A control device for controlling a moving body moving autonomously, at least temporarily, in an area where pedestrians walk includes a processor configured to execute a program to recognize positions of the pedestrians in a time series, calculate an index value indicating a degree of cooperation of each of the pedestrians on a basis of a result of the recognition, set a risk area around each of the pedestrians, the risk area becoming larger as the index value decreases, and generate a route for the moving body to follow in the future to avoid the risk area.

5 Claims, 5 Drawing Sheets

(56) References Cited

U.S. PATENT DOCUMENTS

| | | | | |
|---|---|---|---|---|
| 2015/0206001 | A1* | 7/2015 | Maurer | G06F 18/24 382/103 |
| 2017/0357264 | A1* | 12/2017 | Watanabe | G06V 40/20 |
| 2019/0051180 | A1* | 2/2019 | Vaughn | G08G 1/163 |
| 2019/0381662 | A1 | 12/2019 | Taira et al. | |
| 2020/0394405 | A1 | 12/2020 | Fukui | |
| 2021/0034079 | A1 | 2/2021 | Yamaguchi et al. | |
| 2021/0089795 | A1* | 3/2021 | Tamaki | G06V 20/58 |
| 2021/0101293 | A1 | 4/2021 | Kobayashi et al. | |
| 2021/0114218 | A1 | 4/2021 | Kim et al. | |
| 2021/0183249 | A1* | 6/2021 | Beauchamp | H04W 76/50 |
| 2021/0286985 | A1* | 9/2021 | Russell | G05D 1/0214 |
| 2022/0019228 | A1 | 1/2022 | Yasui et al. | |
| 2024/0231381 | A1 | 7/2024 | Yamada | |

FOREIGN PATENT DOCUMENTS

| | | | |
|---|---|---|---|
| CN | 113985897 A * | 1/2022 | G05D 1/0253 |
| JP | 2004-280451 | 10/2004 | |
| JP | 2009-157615 | 7/2009 | |
| JP | 2009-157735 | 7/2009 | |
| JP | 2011-054082 | 3/2011 | |
| JP | 2012-130986 | 7/2012 | |
| JP | 2012-200818 | 10/2012 | |
| JP | 2013-045265 | 3/2013 | |
| JP | 2013-225253 | 10/2013 | |
| JP | 5539596 | 7/2014 | |
| JP | 2019-079247 | 5/2019 | |
| JP | 2019-219734 | 12/2019 | |
| JP | 2020-046759 | 3/2020 | |
| JP | 2021-022181 | 2/2021 | |
| JP | 2021-060849 | 4/2021 | |
| JP | 2021-064372 | 4/2021 | |
| JP | 2022-013038 | 1/2022 | |
| JP | 2022-017770 | 1/2022 | |
| JP | 2022-177375 | 12/2022 | |
| JP | 2023-017161 | 2/2023 | |
| JP | 2024-030429 | 3/2024 | |
| WO | 2013/011543 | 1/2013 | |
| WO | 2016/104265 | 6/2016 | |
| WO | 2019/116643 | 6/2019 | |
| WO | 2023/047625 | 3/2023 | |

OTHER PUBLICATIONS

European Search Report for European Patent Application No. 24212610.0 mailed Feb. 17, 2025.

Japanese Office Action for Japanese Patent Application No. 2023-193582 mailed Apr. 22, 2025.

* cited by examiner 1
10
HMI
5
20 DETECTION DEVICE
MOVING BODY
30 POSITION IDENTIFICATION DEVICE
100 CONTROL DEVICE
50 SENSOR
MOVING MECHANISM
40

CONTROL DEVICE, CONTROL METHOD, AND STORAGE MEDIUM

CROSS-REFERENCE TO RELATED APPLICATION

Priority is claimed on Japanese Patent Application No. 2023-193582, filed Nov. 14, 2023, the content of which is incorporated herein by reference.

BACKGROUND OF THE INVENTION

Field of the Invention

The present invention relates to a control device, a control method, and a storage medium.

Description of Related Art

In recent years, research and practical application of moving bodies that can move in the same space as pedestrians have been progressing. This type of moving body moves autonomously by generating a route to avoid getting too close to obstacles such as pedestrians. In relation to this, an invention has been disclosed for a device that detects a reaction of a pedestrian to the approach of a moving body and expands or reduces an inaccessible area (personal space) depending on the detected reaction of the pedestrian (JP Patent Publication No. 2009-157735).

SUMMARY OF THE INVENTION

In the related technology, a personal space is expanded when a pedestrian makes a predetermined pre-quantified reaction, such as stopping or making a sharp movement of the upper body. However, such processing may not be able to generate an appropriate route for a moving body on the basis of future movement characteristics of the pedestrian.

The present invention has been made in consideration of such circumstances, and an object of the present invention is to provide a control device, a control method, and a storage medium capable of generating an appropriate route for a moving body on the basis of future movement characteristics of a pedestrian.

The control device, the control method, and the storage medium of the present invention adopt the following configurations.

(1): A control device according to one aspect of the present invention is a control device for controlling a moving body moving autonomously, at least temporarily, in an area where pedestrians walk, the control device including a processor configured to execute a program to: recognize positions of the pedestrians in a time series; calculate an index value indicating a degree of cooperation of each of the pedestrians on a basis of a result of the recognition; set a risk area around each of the pedestrians, the risk area becoming larger as the index value decreases; and generate a route for the moving body to follow in the future to avoid the risk area.

(2): In the above aspect of (1), the processor is configured to execute the program to repeatedly execute prediction of, at a first point in time, a position of the pedestrian at a second point in time later than the first point in time and calculation of, at the second point in time, a difference between the recognized position of the pedestrian and the predicted position of the pedestrian in a time series, and calculate the index value to become larger as a total value of the difference increases.

(3): A control device according to another aspect of the present invention is a control device for controlling a moving body moving autonomously, at least temporarily, in an area where pedestrians walk, the control device including a processor configured to execute a program to: recognize positions of the pedestrians in a time series; calculate an index value for each of the pedestrians on a basis of a result of the recognition; set a risk area around each of the pedestrians, the risk area becoming larger as the index value decreases; and generate a route for the moving body to follow in the future to avoid the risk area. The processor is configured to execute the program to repeatedly execute prediction of, at a first point in time, a position of the pedestrian at a second point in time later than the first point in time and calculation of, at the second point in time, a difference between the recognized position of the pedestrian and the predicted position of the pedestrian in a time series, and calculate the index value to become larger as a total value of the difference increases.

(4): In the above aspect of any one of (1) to (3), the processor is configured to execute the program to calculate the index value by narrowing down targets to pedestrians who are passing by the moving body or other pedestrians.

(5): In the above aspect of (4), the processor is configured to execute the program to set the risk area using a value near an upper limit of a possible range of the index value instead of the index value for pedestrians for whom the index value has not been calculated.

(6): A control method according to another aspect of the present invention is a control method using a control device for controlling a moving body moving autonomously, at least temporarily, in an area where pedestrians walk, the control method including: recognizing positions of the pedestrians in a time series; calculating an index value indicating a degree of cooperation of each of the pedestrians on a basis of a result of the recognition; setting a risk area around each of the pedestrians, the risk area becoming larger as the index value decreases; and generating a route for the moving body to follow in the future to avoid the risk area.

(7): A control method according to another aspect of the present invention is a control method using a control device for controlling a moving body moving autonomously, at least temporarily, in an area where pedestrians walk, the control method including: recognizing positions of the pedestrians in a time series; calculating an index value for each of the pedestrians on a basis of a result of the recognition; setting a risk area around each of the pedestrians, the risk area becoming larger as the index value decreases; and generating a route for the moving body to follow in the future to avoid the risk area, wherein the calculating includes repeatedly executing prediction of, at a first point in time, a position of the pedestrian at a second point in time later than the first point in time and calculation of, at the second point in time, a difference between the recognized position of the pedestrian and the predicted position of the pedestrian in a time series, and calculating the index value to become larger as a total value of the difference increases.

(8): A computer-readable non-transitory storage medium storing a program according to another aspect of the present invention is a program for causing a processor of a control device for controlling a moving body moving autonomously, at least temporarily, in an area where pedestrians walk to: recognize positions of the pedestrians in a time series; calculate an index value indicating a degree of cooperation of each of the pedestrians on a basis of a result of the recognition; set a risk area around each of the pedestrians, the risk area becoming larger as the index value decreases; and generate a route for the moving body to follow in the future to avoid the risk area.

(9): A computer-readable non-transitory storage medium storing a program according to another aspect of the present invention is a program for causing a processor of a control device for controlling a moving body moving autonomously, at least temporarily, in an area where pedestrians walk to: recognize positions of the pedestrians in a time series; calculate an index value for each of the pedestrians on a basis of a result of the recognition; set a risk area around each of the pedestrians, the risk area becoming larger as the index value decreases; and generate a route for the moving body to follow in the future to avoid the risk area, wherein the calculating includes repeatedly executing prediction of, at a first point in time, a position of the pedestrian at a second point in time later than the first point in time and calculation of, at the second point in time, a difference between the recognized position of the pedestrian and the predicted position of the pedestrian in a time series, and calculating the index value to become larger as a total value of the difference increases.

According to the above aspects of (1) to (9), it is possible to appropriately generate a route for a moving body on the basis of future movement characteristics of a pedestrian.

DETAILED DESCRIPTION OF THE INVENTION

Hereinafter, an embodiment of a control device, a control method, and a storage medium of the present invention will be described with reference to the drawings. The control device of the present invention controls a drive device of a moving body such that the moving body moves. In the present invention, the moving body is an object that moves autonomously in an area where pedestrians walk. The area where pedestrians walk is a sidewalk, a public open space, a floor inside a building, or the like, and may include a roadway. Although it is assumed that no person rides on the moving body in the following description, a person may ride on the moving body.

A moving body may lead a led subject, follow a following subject, or move independently toward a destination. The led subject or the following subject may be, for example, a pedestrian, but may also be a robot or an animal. When following a following subject, for example, a position around the following subject is treated as a destination. In the following description, it is assumed that the moving body, including the following subject, moves toward the destination. Note that such a movement may not be performed constantly, and may be performed temporarily. For example, when the moving body is in a predetermined state, a control device of the moving body may execute an algorithm of the present invention to perform a movement temporarily.

Figures 1, 2:
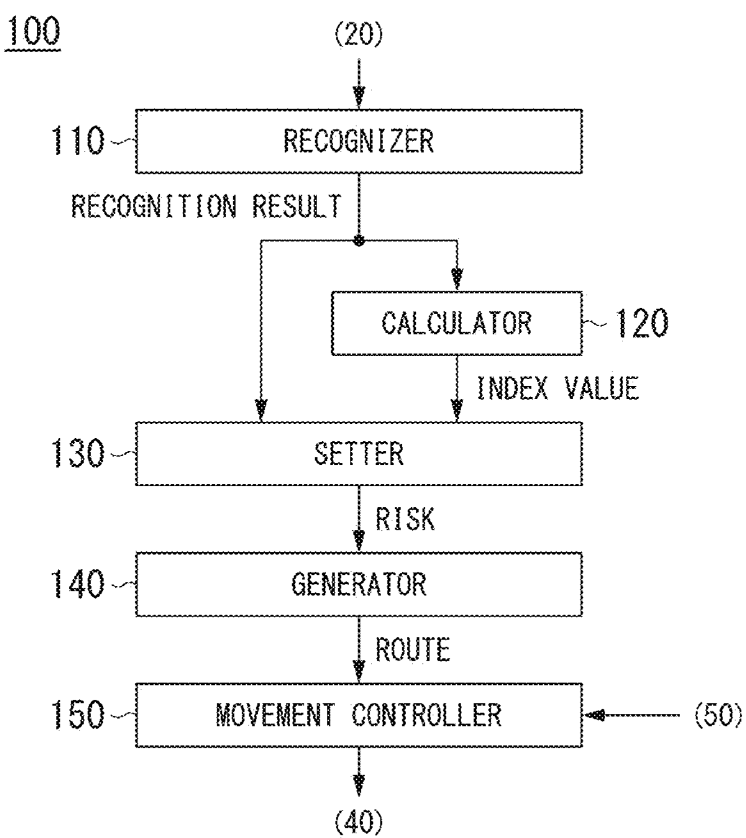
FIG. 1 is a diagram showing a configuration of a moving body 1 equipped with a control device 100.
FIG. 2 is a diagram showing an example of a configuration of the control device 100.

FIG. 1 shows a configuration of a moving body 1 equipped with a control device 100. The moving body 1 includes, for example, an HMI 10, a detection device 20, a position identification device 30, a body part 5 equipped with the control device 100, a moving mechanism 40 attached to the body part 5, and a sensor 50 attached to the moving mechanism 40.

The HMI 10 presents various types of information to a pedestrian and receives input operations of a user. The HMI 10 includes various display devices, speakers, buzzers, touch panels, switches, keys, and the like. For example, the HMI 10 receives input of a destination (a predetermined place, itself, or the like) from the user.

The detection device 20 is a device that generates data for recognizing objects and the pedestrian present around the moving body 1. The detection device 20 includes, for example, sensors such as a camera or a radar device, a light detection and ranging (LIDAR) device, and an ultrasonic sensor that have a detection range around the moving body 1, and an object recognition device that performs sensor fusion processing based on outputs of these sensors to identify an object.

The position identification device 30 is a device that identifies the position of the moving body 1. The position identification device 30 includes, for example, a global navigation satellite system (GNSS) receiver that identifies a position of a subject vehicle M on the basis of signals received from a GNSS satellite. The position identification device 30 may identify or complement the position of the moving body 1 by an inertial navigation system (INS) that uses the output of the sensor 50 which will be described later. The position identification device 30 may also have an electromagnetic wave receiving function and identify or complement the position of the moving body 1 on the basis of the intensity of electromagnetic waves arriving from a surrounding electromagnetic wave source (whose position is known).

The moving mechanism 40 is a mechanism for moving the moving body 1 including the body part 5 in any direction. The moving mechanism 40 includes, for example, a plurality of wheels, a drive motor attached to one or more of the wheels, and a steering device attached to one or more of the wheels. There are no particular restrictions on the configuration of the moving mechanism 40, and the moving mechanism 40 may include pseudo feet for biped walking.

The sensor 50 is a sensor for detecting a behavior of the moving body 1. The sensor 50 includes, for example, a wheel speed sensor for detecting the speed of the wheels, an acceleration sensor for detecting an acceleration acting on the moving body 1, a yaw rate sensor attached near the center of gravity in the horizontal direction of the body part 5, a steering angle sensor for detecting a steering angle of steered wheels (steering wheels), an orientation sensor for detecting an orientation in the horizontal direction of the moving body 1, and the like.

FIG. 2 is a diagram showing an example of a configuration of the control device 100. The control device 100 includes, for example, a recognizer 110, a calculator 120, a setter 130, a generator 140, and a movement controller 150. These components are realized by, for example, a hardware processor such as a central processing unit (CPU) executing a program (software). Some or all of these components may be realized by hardware (including circuitry) such as a large scale integration (LSI) circuit, an application specific integrated circuit (ASIC), a field-programmable gate array (FPGA), or a graphics processing unit (GPU), or may be realized by software and hardware in cooperation. The program may be stored in advance in a storage device such as a hard disk drive (HDD) or a flash memory (a storage device having a non-transient storage medium), or may be stored in a removable storage medium such as a DVD or a CD-ROM (a non-transient storage medium), and may be installed in the storage device when the storage medium is set in a drive device. The control device 100 may store map information including at least a local map of a place where the moving body 1 operates in a storage unit.

Processing of the recognizer 110, the calculator 120, the setter 130, the generator 140, and the movement controller 150 which will be described below is repeatedly executed (executed in a time series) for each of control cycles that arrives at predetermined time periods. Therefore, the moving body 1 does not move along a route generated at a certain point in time until it reaches a destination, and the route is updated to a new one due to changes in the surrounding environment, and the like, and thus details of control of the moving body 1 are updated on the basis of the latest updated route.

The recognizer 110 recognizes objects present around the moving body 1 on the basis of information input from the detection device 20. Objects include pedestrians, including a led subject and a following subject if they are present, and static obstacles. The recognizer 110 recognizes the state of an object, such as the position, speed, and acceleration thereof. The position of an object is recognized as a relative position as viewed from the moving body 1, for example, converted to a position on an imaginary plane S that represents the space around the moving body 1 as a two-dimensional plane as viewed seen from above, and used for subsequent processing. In the following description, it is assumed that a position indicates a single point.

The calculator 120 calculates an index value a for each pedestrian on the basis of the recognition result of the recognizer 110. The index value a indicates a degree of cooperation of the pedestrian. This will be described later.

The setter 130 sets a risk, which is an index value indicating a degree to which the moving body 1 should not enter or approach in the aforementioned imaginary plane S. The higher the risk value, the more likely it is that the moving body 1 should not enter or approach, and the closer the value is to zero, the more favorable it is for the moving body 1 to pass through. However, this relationship may be reversed. If the moving body 1 is capable of flying by boarding a flying object, the setter 130 may perform similar processing in a three-dimensional space instead of the imaginary plane S. A group of areas where the risk regarding an object is not zero is an example of a "risk area."

The setter 130 sets risks on the imaginary plane S not only for the present point in time but also for each future point in time specified at a fixed time interval, such as current time t, after Δt (time t+Δt), after 2Δt (time t+2Δt), . . . . The setter 130 predicts a risk at each future point in time on the basis of changes in the position of a moving target that is continuously recognized by the recognizer 110.

Figure 3:
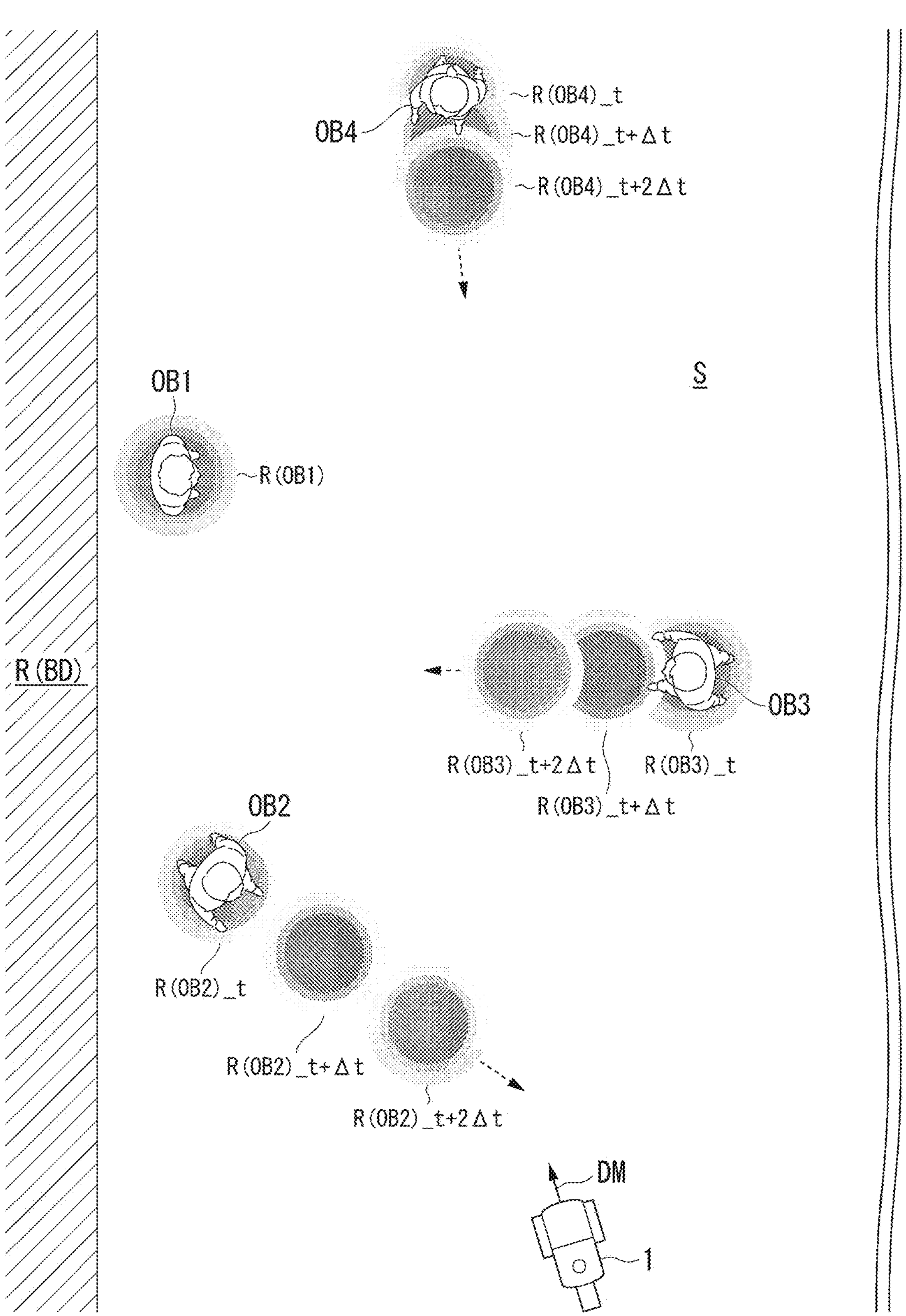
FIG. 3 is a diagram showing an overview of risks set by a setter 130.

FIG. 3 is a diagram showing an overview of risks set by the setter 130. The setter 130 sets risks with ellipses or circles based on moving directions and speeds as contour lines on the imaginary plane S for objects other than the moving body 1, and sets a fixed value of risk for a non-movable area BD such as a wall. In the figure, DM is the moving direction of the moving body 1. R(OB1) is the risk of a stationary object (person standing on the spot) OB1, R(OB2) is the risk of a moving object (pedestrian) OB2, R(OB3) is the risk of a moving object (pedestrian) OB3, and R(OB4) is the risk of a moving object (pedestrian) OB4. Since the pedestrians continue to move, the risks are set at positions different from the current time for each future point in time. R(OB2)_t is the risk of the object OB2 in a certain control cycle, R(OB2)_t+Δt is the risk of the object OB2 in the next control cycle, and R(OB2)_t+Δ2t is the risk of the object OB2 in the next control cycle. R(BD) is the risk of non-movable area BD. In the figure, the density of hatching indicates the value of the risk, and the darker the hatching, the greater the risk.

Figure 4:
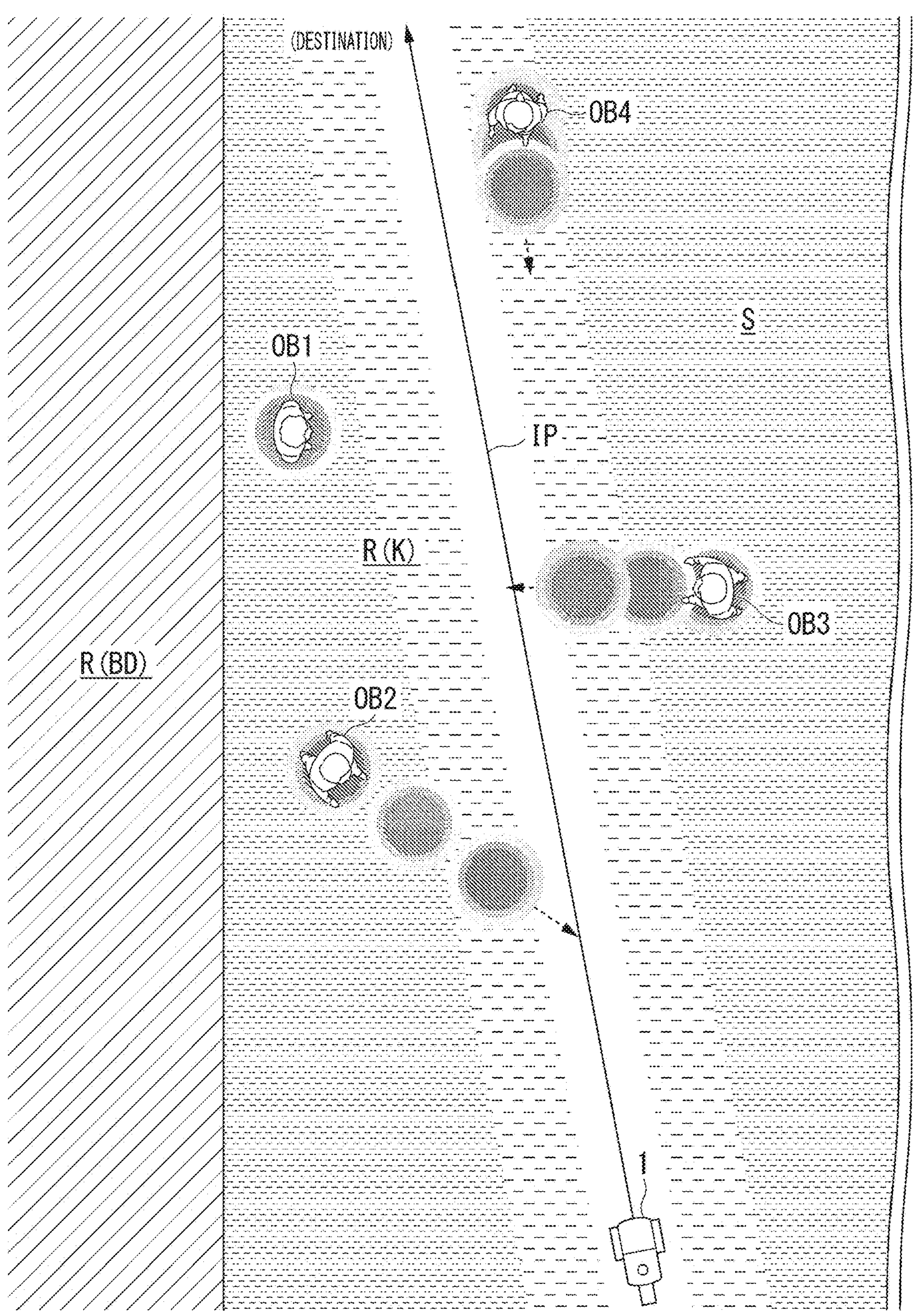
FIG. 4 is a diagram showing an example of a distribution of risks set in consideration of deviations from an ideal route IP.

The setter 130 may set an ideal route connecting the moving body 1 to the destination of the moving body 1, and may increase the risk as a deviation from the ideal route increases. FIG. 4 is a diagram showing an example of a distribution of risks set in consideration of deviations from an ideal route IP. In the figure, R (K) is a risk based on a deviation from the ideal route IP. Although the ideal route IP is set as a straight line in the example of FIG. 4, the ideal route IP may be set as a broken line or a curved line at a corner where the moving body 1 turns, or the like depending on the structure of the place where the moving body 1 moves. In this case, the setter 130 (or other components) performs processing such as dividing a moving range into links and determining a detailed position for each link to generate the ideal route IP.

The generator 140 generates a route to be taken by the moving body 1 in the future on the basis of risks based on the recognition result of the recognizer 110 such that the moving body 1 passes through places with low risks (in other words, avoids risk areas). The generator 140 generates a route by, for example, sequentially connecting positions where risks corresponding to future points in time are not equal to or greater than a threshold value at each future point in time. There may be more than one route that satisfies this condition, and a plurality of route candidates may be generated. The generator 140 may calculate a score for each of the plurality of route candidates and select a route candidate with the highest score as a route. For example, the generator 140 calculates the score such that the score increases as a degree of turning (e.g., evaluated by the angle between a vector from a past trajectory point to a target trajectory point and a vector from the target trajectory point to a future trajectory point) decreases and the sum of risks for each passing point decreases.

The movement controller 150 controls the moving mechanism 40 such that the moving body 1 moves along a route. The movement controller 150 controls the drive motor and steering device such that the position and behavior of the moving body 1 obtained from the output of the sensor 50 approach the route.

[Setting of Index Value and Risk Area Based Thereon]

Figure 5:
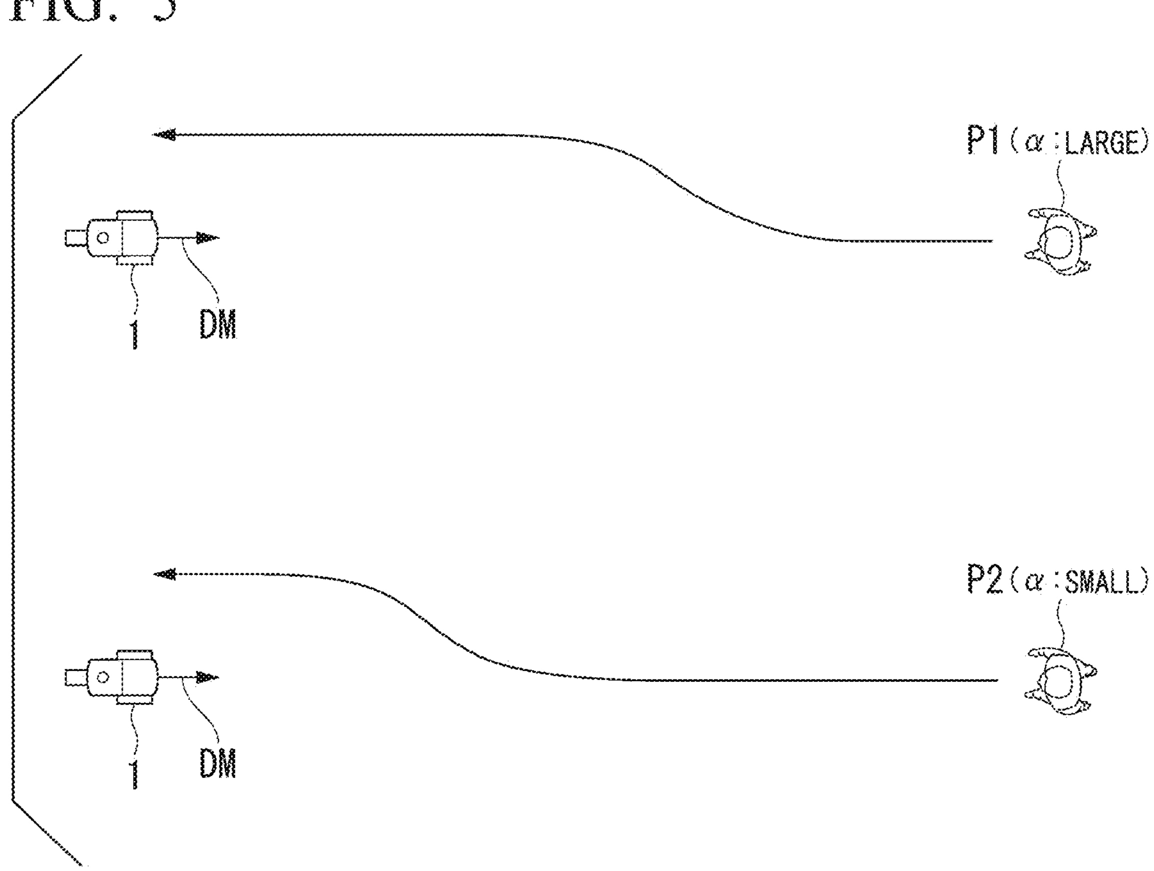
FIG. 5 is a diagram comparing an expected behavior of a pedestrian P1 with high cooperation when passing by a moving body 1 with an expected behavior of a pedestrian P2 with low cooperation when passing by the moving body 1.

The relationship between the index value a and the risk area will be described below. The calculator 120 repeatedly executes prediction of a position of a pedestrian at a second point in time later than a first point in time, and calculation of the difference between the recognized position of the pedestrian at the second point in time and a position of the pedestrian predicted at the first point in time in a time series, and calculates the index value a such that it becomes larger as the value of the sum of differences increases. The index value a represents the degree and frequency of change of course by the pedestrian, and thus represents the degree to which the pedestrian changed course after viewing the moving body 1 or other pedestrians, that is, cooperation. FIG. 5 is a diagram comparing an expected behavior (course R1) of a pedestrian P1 with high cooperation (large index value a) when passing by the moving body 1 with an expected behavior (course R2) of a pedestrian P2 with low cooperation (small index value a) when passing by the moving body 1. As shown, the pedestrian with high cooperation is expected to change his/her course early to avoid approaching the moving body 1, whereas the pedestrian with low cooperation is expected to change his/her course only after approaching the moving body 1 as close as possible.

In addition, the index value a can be calculated not only when a pedestrian changes his/her course after viewing the moving body 1, but also when a pedestrian changes his/her course after viewing other pedestrians. Even when a pedestrian and the moving body 1 are far apart, the index value a may be calculated on the basis of a degree to which the pedestrian has changed his/her course after viewing another pedestrian. Accordingly, the index value a can be calculated for a wider range of pedestrians.

Figure 6:
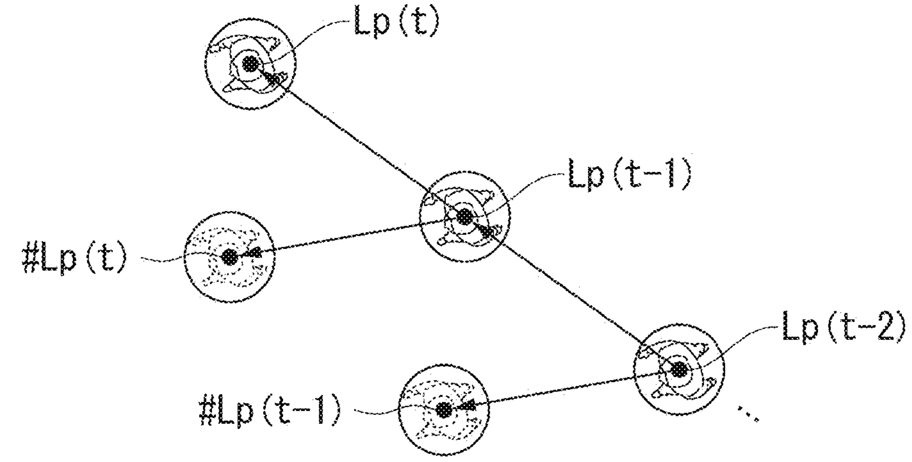
FIG. 6 is a diagram showing details of processing performed by a calculator 120.

FIG. 6 is a diagram showing details of processing performed by the calculator 120. In the figure, t, t−1, t−2, . . . represent control timings (hereinafter referred to as times) that arrive at predetermined intervals, Lp(t) represents the position of a pedestrian at time t, and #Lp(t) represents the position of the pedestrian at time t predicted at time t−1. At the control timings that arrive at predetermined intervals, the calculator 120 predicts the position of the pedestrian at the control timing one time ahead (or a predetermined time ahead). For example, the calculator 120 assumes a constant speed or constant acceleration state, and predicts a position of the pedestrian by extending a movement vector between the previous time and the current time. Then, the calculator 120 calculates the index value a on the basis of, for example, Formula (1). In the formula, q is the number of steps back when totaling differences.

$$\alpha = \sum_{k=t-q}^{t} \{Lp(k) - \#LP(k)\} \tag{1}$$

The setter 130 sets a risk area by reflecting the index value a. Although the setter 130 sets a circular risk area in the following, the risk area is set on the basis of the same principle even if it is set to an ellipse or other shapes. For example, the setter 130 determines the radius r of the risk area on the basis of Formula (2). In the formula, D is the distance between a moving body and a pedestrian, V is the speed of the pedestrian, and a is the index value. The function f is a function that returns a smaller value as D increases, returns a larger value as V increases, and returns a smaller value as a increases.

$$r = f(D, V, \alpha) \tag{2}$$

Figure 7:
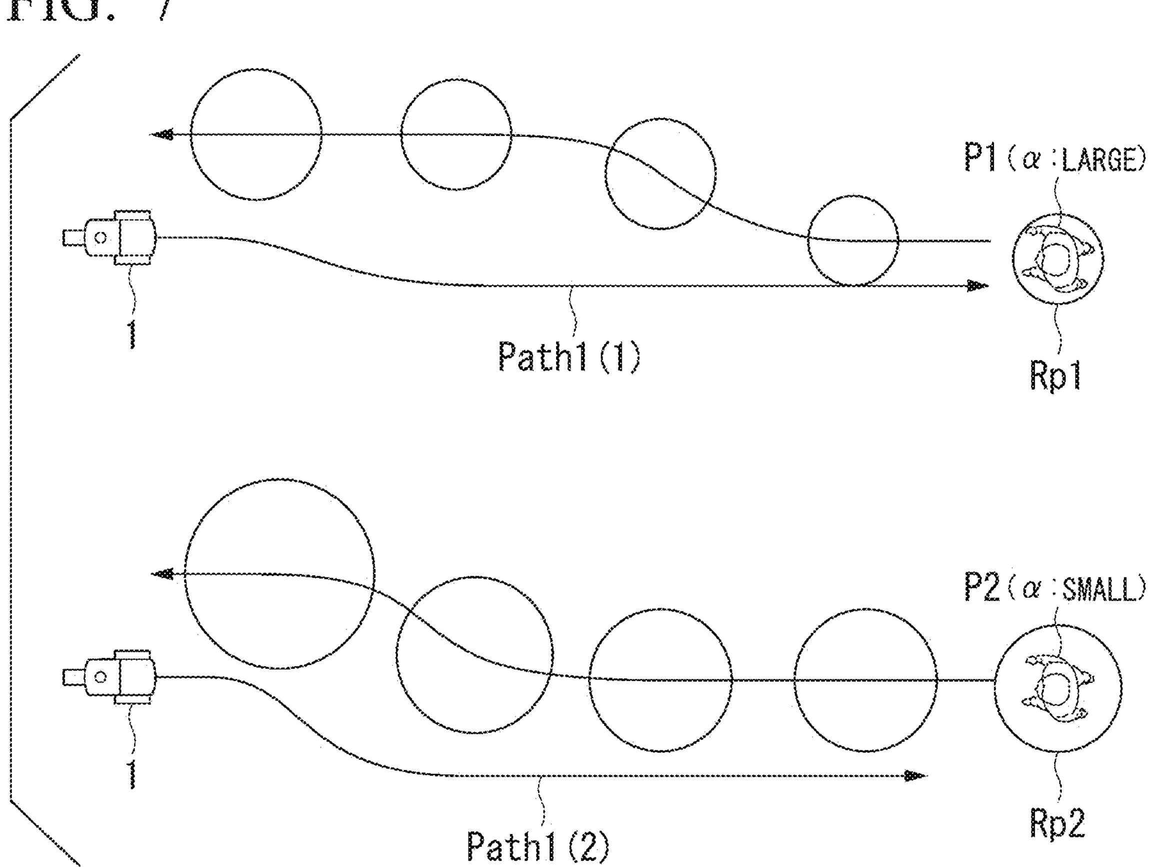
FIG. 7 is a diagram showing an example of a case in which transition of a risk area set according to the above-mentioned principle is applied to the pedestrians P1 and P2 shown in FIG. 5.

FIG. 7 is a diagram showing an example of a case in which transition of a risk area set by the above-described principle is applied to the pedestrians P1 and P2 shown in FIG. 5. In this figure, it is assumed that the speeds of the pedestrians P1 and P2 are the same. In the figure, Path1(1) and Path1(2) are routes of the moving body 1 generated in respective cases. As shown, both a risk area Rp1 corresponding to the pedestrian P1 and a risk area Rp2 corresponding to the pedestrian P2 become larger as they approach the moving body 1, but the risk area Rp2 is set larger at an earlier stage than the risk area Rp1, and is steadily set larger thereafter. Due to the processing characteristics of the generator 140 described above, the route of the moving body 1 is set so as to largely avoid the pedestrian P2, and thus an avoidance trajectory can be taken early for a pedestrian with a relatively high probability of contact and a small index value a.

In this manner, according to the embodiment, it is possible to appropriately generate a route of the moving body on the basis of future movement characteristics of pedestrians.

Figure 8:
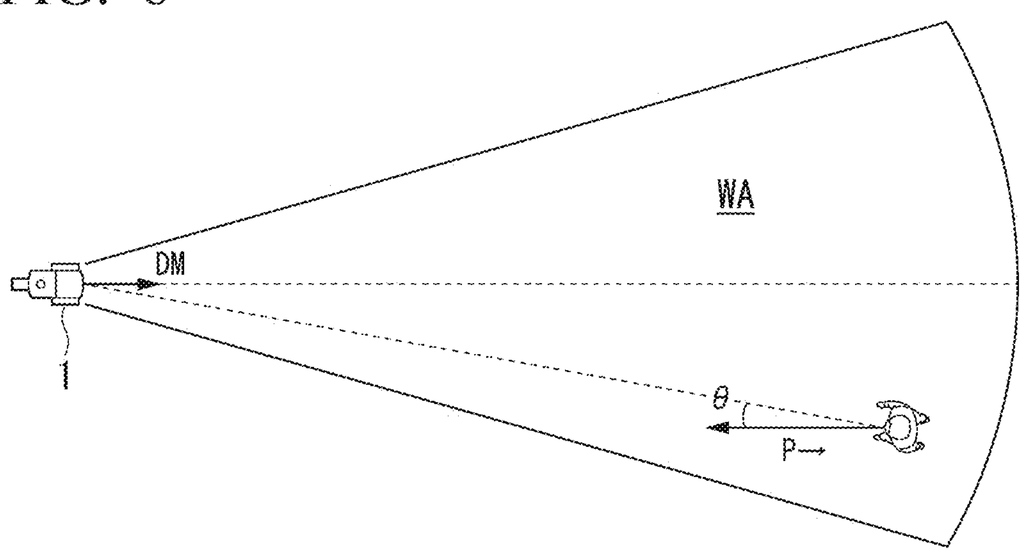
FIG. 8 is a diagram showing a pedestrian passing by the moving body 1.

The calculator 120 may perform the above-described processing of calculating the index value a only for pedestrians who are passing by the moving body 1 or other pedestrians. FIG. 8 is a diagram showing a pedestrian who is passing by the moving body 1. As shown, the calculator 120 may set a monitoring area WA with the moving direction DM of the moving body 1 as a center and calculate the index value a by narrowing down targets to a pedestrian who is within the monitoring area and for whom an angle θ formed by a straight line connecting the pedestrian and the moving body 1 and the movement vector P→ of the pedestrian is within a predetermined range, and may not calculate the index value a for other pedestrians. In this case, since the pedestrians excluded from the narrowing down are pedestrians who are of low importance in route generation for the moving body 1, instead of the index value a, a value near the upper limit of a possible range of the index value a may be used to determine the radius r of the risk area. Pedestrians who are passing by other pedestrians can also be extracted using a similar method.

The above-described embodiment can be represented as follows.

A control device for controlling a moving body moving autonomously, at least temporarily, in an area where pedestrians walk, the control device including:

one or more storage media in which computer-readable instructions are stored; and a processor connected to the one or more storage media, wherein the processor is configured to execute the computer-readable instructions to:

recognize positions of the pedestrians in a time series;

calculate an index value indicating a degree of cooperation for each of the pedestrians on a basis of a result of the recognition;

set a risk area around each of the pedestrians, the risk area becoming larger as the index value decreases; and generate a route for the moving body to follow in the future to avoid the risk area.

The above-described embodiment can also be represented as follows.

A control device for controlling a moving body moving autonomously, at least temporarily, in an area where pedestrians walk, the control device including:

one or more storage media in which computer-readable instructions are stored; and a processor connected to the one or more storage media, wherein the processor is configured to execute the computer-readable instructions to:

recognize positions of the pedestrians in a time series;

calculate an index value for each of the pedestrians on a basis of a result of the recognition;

set a larger risk area around each of the pedestrians, the risk area becoming larger as the index value decreases; and generate a route for the moving body to follow in the future to avoid the risk area, wherein the calculating includes: repeatedly executing prediction of, at a first point in time, a position of the pedestrian at a second point in time later than the first point in time and calculation of, at the second point in time, a difference between the recognized position of the pedestrian and the predicted position of the pedestrian in a time series; and calculating the index value to become larger as a total value of the difference increases.

Although forms for carrying out the present invention using an embodiment have been described above, the present invention is not limited to such an embodiment, and various modifications and substitutions can be made without departing from the spirit and scope of the present invention.

What is claimed is:

1. A control device for controlling a moving body moving autonomously, at least temporarily, in an area where pedestrians walk, the control device comprising a processor configured to execute a program to:

recognize positions of the pedestrians in a time series;

calculate an index value, the index value indicating a degree of cooperation of each of the pedestrians on a basis of the positions of the pedestrians in the time series, the index value representing a degree and frequency of change of course by each of the pedestrians;

set a risk area around each of the pedestrians, the risk area being a group of areas where a risk regarding an object is not zero, the risk area becoming larger as the index value decreases;

generate a route for the moving body to follow in the future to avoid the risk area;

repeatedly execute prediction of, at a first point in time, a position of the pedestrian at a second point in time later than the first point in time and calculation of, at the second point in time, a difference between the recognized position of the pedestrian and the predicted position of the pedestrian in a time series;

calculate the index value to become larger as a total value of the difference increases;

set the risk area based on the index value, at a distance between a moving body and the pedestrian, and a speed of the pedestrian; and move the moving body along the route.

2. The control device according to claim 1, wherein the processor is configured to execute the program to calculate the index value by narrowing down targets to pedestrians who are passing by the moving body or other pedestrians.

3. The control device according to claim 2, wherein the processor is configured to execute the program to set the risk area using a value near an upper limit of a possible range of the index value instead of the index value for pedestrians for whom the index value has not been calculated.

4. A control method using a control device for controlling a moving body moving autonomously, at least temporarily, in an area where pedestrians walk, the control method comprising:

recognizing positions of the pedestrians in a time series;

calculating an index value, the index value indicating a degree of cooperation of each of the pedestrians on a basis of the positions of the pedestrians in the time series, the index value representing a degree and frequency of change of course by each of the pedestrians;

setting a risk area around each of the pedestrians, the risk area being a group of areas where a risk regarding an object is not zero, the risk area becoming larger as the index value decreases;

generating a route for the moving body to follow in the future to avoid the risk area;

repeatedly executing prediction of, at a first point in time, a position of the pedestrian at a second point in time later than the first point in time and calculation of, at the second point in time, a difference between the recognized position of the pedestrian and the predicted position of the pedestrian in a time series;

calculating the index value to become larger as a total value of the difference increases;

setting the risk area based on the index value, a distance between a moving body and the pedestrian, and a speed of the pedestrian; and moving the moving body along the route.

5. A computer-readable non-transitory storage medium storing a program for causing a processor of a control device for controlling a moving body moving autonomously, at least temporarily, in an area where pedestrians walk to:

recognize positions of the pedestrians in a time series;

calculate an index value indicating a degree of cooperation of each of the pedestrians on a basis of the positions of the pedestrians in the time series, the index value representing a degree and frequency of change of course by each of the pedestrians;

set a risk area around each of the pedestrians, the risk area being a group of areas where a risk regarding an object is not zero, the risk area becoming larger as the index value decreases;

generate a route for the moving body to follow in the future to avoid the risk area;

repeatedly execute prediction of, at a first point in time, a position of the pedestrian at a second point in time later than the first point in time and calculation of, at the second point in time, a difference between the recognized position of the pedestrian and the predicted position of the pedestrian in the time series;

calculate the index value to become larger as a total value of the difference increases;

set the risk area based on the index value, a distance between a moving body and the pedestrian, and a speed of the pedestrian; and move the moving body along the route.

* * * * *